US009656861B2

(12) United States Patent
Casse (10) Patent No.: US 9,656,861 B2
(45) Date of Patent: May 23, 2017

(54) SOLAR POWER HARVESTING SYSTEM WITH METAMATERIAL ENHANCED SOLAR THERMOPHOTOVOLTAIC CONVERTER (MESTC)

(71) Applicant: Palo Alto Research Center Incorporated, Palo Alto, CA (US)

(72) Inventor: Bernard D. Casse, Saratoga, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 611 days.

(21) Appl. No.: 14/180,346

(22) Filed: Feb. 13, 2014

(65) Prior Publication Data

US 2015/0228827 A1    Aug. 13, 2015

(51) Int. Cl.
*B82Y 40/00* (2011.01)
*G02B 5/00* (2006.01)
(Continued)

(52) U.S. Cl.
CPC .............. *B82Y 40/00* (2013.01); *G02B 5/008* (2013.01); *H02S 10/30* (2014.12); *B82Y 20/00* (2013.01); *B82Y 30/00* (2013.01); *G02B 5/1809* (2013.01)

(58) Field of Classification Search
CPC .... G02B 5/008; G02B 5/1809; G02B 5/1819; H02S 10/30; H01L 31/09; H01L 31/101
See application file for complete search history.

(56) References Cited

U.S. PATENT DOCUMENTS

| 1,111,239 A | 9/1914 | Smelser |
| 2,712,772 A | 7/1955 | Trombe |

(Continued)

FOREIGN PATENT DOCUMENTS

| CN | 101227158 A | 7/2008 |
| DE | 3205439 A1 | 8/1983 |

(Continued)

OTHER PUBLICATIONS

Chen et al., "Design of tungsten complex gratings for thermophotovoltaic radiators", 2007, Optics Communications 269, pp. 411-417.*

(Continued)

*Primary Examiner* — Devina Pillay
*Assistant Examiner* — Daniel Malley, Jr.
(74) *Attorney, Agent, or Firm* — Bever, Hoffman & Harms, LLP (57) ABSTRACT

A solar power system includes a sunlight concentrating system (e.g., a heliostat), a thermophotovoltaic (TPV) converter and a thermal power system. The TPV converter includes a metamaterial emitter formed on a box-like enclosure, and an associated photovoltaic (PV) cell. The sunlight concentrating system directs the concentrated sunlight through an inlet opening of the box-like enclosure to heat the metamaterial emitter above 1000° K. Bull's eye structures formed on outward-facing surfaces of the box-like enclosure utilize concentric circular ridges spaced at a fixed grating period that, when heated, generate a radiant energy beam having a peak emission wavelength roughly equal to the grating period. The PV cell converts the radiant energy to produce primary electrical energy. Unconverted solar "waste" heat energy exits the box-like enclosure and is converted by the thermal power system (e.g., using a steam generator) to produce secondary electrical energy.

17 Claims, 8 Drawing Sheets

(51) Int. Cl.
*H02S 10/30* (2014.01)
*B82Y 20/00* (2011.01)
*G02B 5/18* (2006.01)
*B82Y 30/00* (2011.01)

(56) References Cited

U.S. PATENT DOCUMENTS

| | | | |
|---|---|---|---|
| 2,913,583 A | 11/1959 | Regnier et al: | |
| 3,861,379 A | 1/1975 | Anderson, Jr. | |
| 3,892,433 A | 7/1975 | Blake | |
| 3,905,352 A | 9/1975 | Jahn | |
| 3,923,381 A | 12/1975 | Winston | |
| 3,924,604 A | 12/1975 | Anderson | |
| 4,068,653 A | 1/1978 | Bourdon et al. | |
| 4,109,638 A | 8/1978 | Matlock et al. | |
| 4,110,009 A | 8/1978 | Bunch | |
| 4,110,010 A | 8/1978 | Hilton | |
| 4,110,123 A | 8/1978 | Goetzberger et al. | |
| 4,114,596 A | 9/1978 | Chang et al. | |
| 4,117,682 A | 10/1978 | Smith | |
| 4,130,109 A | 12/1978 | Brueck | |
| 4,148,301 A | 4/1979 | Cluff | |
| 4,149,902 A | 4/1979 | Mauer et al. | |
| 4,153,813 A | 5/1979 | Blieden et al. | |
| 4,190,465 A | 2/1980 | Boling | |
| 4,193,819 A | 3/1980 | Wohlmut | |
| 4,209,231 A | 6/1980 | Sayre | |
| 4,218,114 A | 8/1980 | Bunch | |
| 4,234,352 A * | 11/1980 | Swanson | F24J 2/07 136/253 |
| 4,261,335 A | 4/1981 | Balhorn | |
| 4,266,530 A | 5/1981 | Steadman | |
| 4,440,153 A | 4/1984 | Melchior | |
| 4,771,764 A | 9/1988 | Cluff | |
| 4,935,631 A | 6/1990 | Mosley et al. | |
| 5,180,441 A | 1/1993 | Cornwall et al. | |
| 5,274,497 A | 12/1993 | Casey | |
| 5,816,238 A | 10/1998 | Burns et al. | |
| 6,239,353 B1 | 5/2001 | Hall et al. | |
| 6,820,611 B2 | 11/2004 | Kinoshita | |
| 6,953,038 B1 | 10/2005 | Nohrig | |
| 7,192,146 B2 | 3/2007 | Gross et al. | |
| 7,677,241 B2 | 3/2010 | Hickerson | |
| 7,706,030 B2 | 4/2010 | Herloski et al. | |
| 8,354,628 B2 | 1/2013 | Schmaelzle et al. | |
| 2002/0179138 A1 | 12/2002 | Lawheed | |
| 2003/0016539 A1 | 1/2003 | Minano et al. | |
| 2003/0051750 A1 | 3/2003 | Lawheed | |
| 2007/0137690 A1 | 6/2007 | Bruning et al. | |
| 2007/0137691 A1 | 6/2007 | Cobb et al. | |
| 2008/0308154 A1 | 12/2008 | Cart et al. | |
| 2009/0038608 A1 | 2/2009 | Caldwell | |
| 2009/0126778 A1 | 5/2009 | Brounne et al. | |
| 2009/0205701 A1 | 8/2009 | Govaerts et al. | |
| 2009/0235974 A1 | 9/2009 | Mapel et al. | |
| 2010/0051016 A1 | 3/2010 | Ammar | |
| 2010/0110430 A1 * | 5/2010 | Ebbesen | B82Y 20/00 356/331 |
| 2010/0252027 A1 | 10/2010 | Sankrithi | |
| 2011/0000543 A1 * | 1/2011 | Errico | H02S 20/32 136/259 |
| 2011/0079267 A1 | 4/2011 | Raymond et al. | |
| 2011/0284059 A1 | 11/2011 | Celanovic | |
| 2012/0031467 A1 | 2/2012 | Schmaelzle et al. | |
| 2012/0161600 A1 * | 6/2012 | Norris | B81C 99/009 313/11 |
| 2012/0192917 A1 | 8/2012 | Whitted et al. | |
| 2012/0325313 A1 | 12/2012 | Cheung et al. | |
| 2012/0325314 A1 | 12/2012 | Cheung et al. | |
| 2013/0047609 A1 | 2/2013 | Schmaelzle et al. | |
| 2013/0047977 A1 | 2/2013 | Schmaelzle et al. | |
| 2015/0228827 A1 | 8/2015 | Casse | |

FOREIGN PATENT DOCUMENTS

| | | |
|---|---|---|
| DE | 3633172 A1 | 4/1988 |
| EP | 0575797 A1 | 12/1993 |
| WO | 2007109901 A1 | 10/2007 |
| WO | 2010/033859 A2 | 3/2010 |
| WO | 2011/012545 A1 | 2/2011 |
| WO | 2011/148307 A2 | 12/2011 |

OTHER PUBLICATIONS

Chen, Y.B., et al. "Design of tungsten complex gratings for thermophotovoltaic radiators", ScienceDirect, Optics Communications 269 (2007), pp. 411-417, accepted Aug. 16, 2006.
Parc, "Large Area Micro-optics for Solar Energy", Feb. 20, 2013, 1 page.
Currie et al. "High-Efficiency Organic Solar Concentrators for Photovoltaics", Science 321 (2008), pp. 226-228.
Dersch et al. "Trough integration into power plants—a study on the performance and economy of integrated solar combined cycle systems", Energy, vol. 29, Issues 5-6, Apr.-May 2004, pp. 947-959.
Goetzberger et al. "Photovoltaic materials, history, status and outlook", Materials Science and Engineering R 40 (2003), pp. 1-46.
Jones et al. "Rotating Field Collector Subsystem Study and Evaluation", Sandia Contractor Report, 1982, 144 pages.
Kolb et al. "Heliostat Cost Reduction Study", Sandia National Laboratory, Sandia Report SAND2007-3293, Jun. 2007, 159 pages.
Meyer: "Photon Transport in Fluorescent Solar Collectors", Thesis for the degree of Doctor of Philosophy, School of Engineering Sciences, University of Southampton, Jul. 2009, 197 pages.
Murphy, Jr. "Home photovoltaic systems for physicists", Physics Today, Jul. 2008, pp. 42-47.
Schramek et al. "Heliostats for maximum ground coverage", Energy 29 (2004), pp. 701-713.
Smestad et al. "The thermodynamic limits of light concentrators", Solar Energy Materials 21 (1990), pp. 99-111.
Weber et al. "Luminescent greenhouse collector for solar radiation", Applied Optics, vol. 15, No. 10, Oct. 1976, pp. 2299-2300.

* cited by examiner

SOLAR POWER HARVESTING SYSTEM WITH METAMATERIAL ENHANCED SOLAR THERMOPHOTOVOLTAIC CONVERTER (MESTC)

FIELD OF THE INVENTION

This invention relates to apparatus and methods for converting solar energy to electric power.

BACKGROUND OF THE INVENTION

Thermophotovoltaic (TPV) energy conversion involves the conversion of heat to electricity, and has been identified as a promising technology since the 1960's. A basic TPV system includes a thermal emitter and a photovoltaic diode receiver. The thermal emitter is typically a piece of solid material or a specially engineered structure that generates thermal emission when heated to a high temperature (i.e., typically in a range from about 1200° K to about 1500° K). Thermal emission is the spontaneous radiation (emission) of photons due to thermal motion of charges in the thermal emitter material. For normal TPV system operating temperatures, the radiated photons are mostly at near infrared and infrared frequencies. The photovoltaic diode receiver includes a photovoltaic (PV) cell positioned to absorb some of these radiated photons, and is constructed to convert the absorbed photons into free charge carriers (i.e., electricity) in the manner typically associated with conventional solar cells. In effect, a solar energy system is a type of TPV energy conversion system where the sun acts as the thermal emitter. However, the present invention is directed to "earth-bound" TPV energy conversion systems in which the thermal emitter is solid structure that is heated from an external source (e.g., by concentrated sunlight or other heat generator).

Although TPV energy conversion is promising in theory, practical conventional TPV systems have achieved far lower efficiencies than theoretically predicted. A TPV system can be modeled as a heat engine in which the hot body (i.e., the heated thermal emitter) is described as a blackbody radiation source having a black body temperature $T_{BB}$, and the relatively cold PV receiver has a temperature $T_{PV}$, whereby the theoretical thermodynamic efficiency limit is given by the Carnot cycle $\eta_{Carnot}=(T_{BB}-T_{PV})/T_{BB}$. For a thermal emitter temperature $T_{BB}$ equal to 1500° K and a PV receiver temperature $T_{PV}$ equal to 300° K, a theoretical efficiency $\eta_{Carnot}$ equals 0.8 (80%), which exceeds the Shockley-Queisser limit (i.e., the maximum theoretical efficiency of a solar cell using a p-n junction to collect power). In reality, however, the efficiencies of conventional TPV systems are reported to be below 10%. This is believed to stem from a mismatch between the spectrum of the thermal emitter and the PV cell.

One reason for the lower realized efficiencies of conventional TPV systems is related to carrier thermalization at high temperatures caused by a mismatch between the emitted photons and the PV cells. Thermal radiation from the thermal emitter (hot body) of a TPV system has a spectral power density given by Planck's law, and the peak wavelength $\lambda_{max}$ is given by Wien's law ($\lambda_{max}\sim(2898/T_{BB})$ μm). For high-temperature emitters (1100° K≤$T_{BB}$≤1500° K), the peak wavelength $\lambda_{max}$ is in the range of 1.9 to 2.6 μm, which requires the TPV system to utilize PV cells having low bandgap semiconductors (i.e., around 0.5-0.8 eV). Using such low bandgap PV cells requires the use of emitter materials having bandgaps closer to 0.5 eV (~2.5 μm) in order to obtain a larger fraction of in-band photons at reasonable emitter temperatures (i.e., 1100-1500° K). If emitter materials having bandgaps below 0.5 eV are used, the PV cell performance suffers from high carrier thermalization at the elevated temperatures required in TPV systems.

What is needed is a solar power harvesting system that converts solar energy to electrical energy with an efficiency of 42% or higher.

SUMMARY OF THE INVENTION

The present invention is directed to a high efficiency solar power system that utilizes a sunlight concentrating system (e.g., a heliostat) to provide solar energy (i.e., concentrated sunlight) to a novel solar thermophotovoltaic (TPV) converter and a thermal storage system. The novel solar TPV converter utilizes a spectrally-selective metamaterial emitter that matches the optimal conversion spectrum of an associated low-bandgap photovoltaic (PV) cell to convert the solar energy into primary electric energy with an efficiency of greater than 25% at elevated operating temperatures (i.e., greater than 1400° K). The thermal storage system is operably coupled to the metamaterial emitter to capture (and optionally store) unused thermal energy from (i.e., solar energy not converted by) the TPV converter, and to convert the unused thermal energy into secondary electric energy. By combining the novel solar TPV converter and the thermal storage system, the present invention provides a solar power system capable of generating total system electrical power at an efficiency of 42% or greater, which represents a dramatic improvement over existing conventional solar power systems.

According to an aspect of the present invention, the spectrally-selective metamaterial emitter includes a box-like enclosure having an interior cavity surrounded by a peripheral wall, and at least one novel bull's eye structure disposed on outward-facing surfaces of the peripheral wall. The box-like enclosure is fixedly disposed and operably positioned relative to the sunlight concentrating system (e.g., on a tower above a ground-based heliostat) such that the concentrated sunlight is directed through an inlet opening into the interior cavity, whereby the box-like enclosure is heated to an suitable operating temperature (i.e., above 1000° K). The novel bull's eye structures includes concentric circular ridge structures disposed in an associated fixed grating period that emit a highly directional, narrow spectral width radiant energy beam having a peak emission wavelength roughly equal to the fixed grating period. That is, the metamaterial thermal emitter effectively functions as a narrowband filter element with a spectral response that is selectively "tunable" by way of adjusting the fixed grating period. The PV cells are positioned to receive the radiant energy beam, and are "matched" to the metamaterial emitter in that their optimal radiation absorption/conversion wavelengths (absorption curves) correspond to (i.e., equal or overlap) the peak emission wavelengths of the radiant energy beam. By optimally "matching" the spectrum of a PV cell using the spectrally-selective metamaterial emitter, the solar power system of the present invention is able to generate primary electric energy at much higher efficiencies than is possible using conventional systems.

According to an embodiment of the present invention, the sunlight concentrating system includes multiple optical elements (e.g., lenses and/or mirrors) that are operably disposed to generate concentrated sunlight with a sufficient intensity (e.g., greater than 100 suns) at the inlet opening of the box-like enclosure to heat the metamaterial emitter to an optimal operating temperature (i.e., between 1000° K and 1500° K) during daylight hours. In addition, the entire metamaterial thermal emitter (i.e., both the box-like enclosure and the bull's eye" structures) is implemented as an all-metal structure (i.e., entirely formed using one or more metals or metal alloys). This all-metal construction is critical for withstanding the high optimal operating temperatures (i.e., 1000° K to 1500° K) without delamination (which can occur when one or more dielectric are used), and because metallic surfaces support surface plasmons or spoof surface plasmons that are required to facilitate the efficient emission of the highly directional, narrow band radiant energy and having the desired peak emission wavelength. In a specific embodiment, both the box-like enclosure and the bull's eye" structure are entirely formed using one or more refractory metals (e.g., Rhenium, Tantalum or Tungsten) because these metals are able to withstand the higher operating temperatures (i.e., approaching 1500° K) without melting or deforming. In a presently preferred embodiment, both the box-like enclosure and the bull's eye" structure are entirely formed using Rhenium or a Rhenium alloy because the ability of this metal/alloys to withstand high temperatures is well known from their use in high-performance jet and rocket engines.

Because the in-band photons associated with most PV cells are in the range of 0.5 microns to 3 microns, this means that the bull's eye structures are fabricated with fixed grating periods in the range of 10 nanometers and 5 microns. In a presently preferred embodiment, a metamaterial emitter is produced with bull's eye structures having a grating period in the range of 0.5 to 3.0 microns (e.g., 1.5 microns) in order to match the specific absorption curves of a selected low-bandgap (e.g., GaSb) PV cell having a cell-specific optimal wavelength range of 1.0 to 2.0 microns.

According to a specific embodiment of the present invention, the metamaterial thermal emitter is configured to include multiple bull's eye structures disposed in an array of the peripheral wall of the box-like enclosure in order to produce a broad spectral bandwidth radiant energy beam thus increasing the number of in-band photons that are efficiently converted by the associated PV cell into electricity. In a specific embodiment, the bull's eye structures are disposed in sets of two or more, with each bull's eye structure of each set having a corresponding fixed grating period between adjacent concentric circular ridges that is different from the fixed grating periods of the other bull's eye structures of that set. In an exemplary embodiment, the associated PV cell is a low-bandgap PV cell having an optimal wavelength range of approximately 1.5 microns, and each set includes three bull's eye structures respectively having concentric circular ridges that are formed with corresponding fixed grating periods that are equal to 1.3 microns, 1.5 microns and 1.7 microns, respectively. The different bull's eye structures of each set produce a mix of photons having the various wavelengths determined by the different grating periods, thereby producing a broadened emission spectrum that overlaps the associated PV cell's optimal wavelength range, which increases the number of in-band photons for conversion by the associated PV cell.

In another specific embodiment, the metamaterial thermal emitter of a TPV converter is configured to include an array of bull's eye structures arranged in a multiplexed (overlapping) pattern (i.e., such that at least some of the concentric circular ridge structures of each bull's eye structure intersect at least some of the concentric circular ridge structures of an adjacent bull's eye structure, thereby concentrating the emitted radiant energy to increase the PV cell's output power density. Further, by disposing the bull's eye structures in sets having different fixed grating periods, as described above, the metamaterial thermal emitter both concentrates and combines adjacent narrowband spectra to produce a high energy emission with a broader overall spectrum that can be used, for example, to maximize the number of in-band photons converted by a target PV cell, thereby maximizing the PV cell's output power density.

According to an exemplary embodiment of the present invention, the metamaterial emitter of a TPV converter includes a box-like enclosure formed by a peripheral wall, with one or more bull's eye structures disposed as described above on at least two outward facing surfaces of the peripheral wall (i.e., such that at least two radiant energy beams are emitted in at least two (e.g., upward and downward) directions from the metamaterial emitter), and the TPV converter further includes at least two PV cells positioned to receive the at least two radiant energy beams. The peripheral wall of the emitter's box-like enclosure surrounds a substantially rectangular interior cavity and includes an inlet opening through which heat energy (e.g., concentrated sunlight) is supplied into the cavity during operation, and an outlet opening through which waste heat is allowed to exit the cavity. Each bull's eye structure is configured to generate a radiant energy beam that is matched to the associated PV cell positioned to receive the radiant energy beam. This arrangement provides optimal energy beam generation because the flat/planar wall surfaces facilitate cost-effective fabrication of the bull's eye structures (i.e., using existing photolithographic fabrication techniques), and the rectangular-shaped interior cavity defined between the two opposing flat peripheral wall portions facilitates efficient transfer of heat energy (e.g., by allowing concentrated sunlight to reflect between the opposing interior surfaces as it propagates along the interior cavity). In one embodiment, the box-like enclosure is formed entirely from refractory metals (e.g., Rhenium, Tantalum or Tungsten) to facilitate the required high operating temperatures (i.e., 1000 to 1500° K) and to enhance the enclosure's operational lifetime.

According to another embodiment of the present invention, a solar-tower power harvesting system is implemented by mounting a metamaterial emitter on a tower, and utilizes a heliostat (sunlight concentrating system) including multiple mirrors to reflect sunlight beams onto the raised metamaterial emitter. The heliostat includes an array of mirrors that are disposed at ground level and are controlled (e.g., rotated and tilted) in a manner that tracks the sun's azimuth and elevation angles such that sunlight is reflected onto the raised metamaterial emitter at all times during daylight hours. In yet another specific embodiment, the box-like enclosure includes compound parabolic trough structures respectively integrally connected to front end portions of the opposing peripheral wall portions, wherein the compound parabolic trough structures are configured to channel solar energy into the interior cavity in a manner that maximizes the transfer of heat energy to the peripheral wall portions, which in turn maximizes the amount of radiant energy emitted in the radiant energy beam to the associated PV cells. In addition, a funnel-shaped outlet opening is formed by corresponding metal structures respectively integrally connected to the rear end portions of the peripheral wall portions. In a specific embodiment, the box-like enclosure is maintained at a tilted angle (i.e., such that the outlet opening is higher than the inlet opening) in order to facilitate transfer of solar energy into the interior cavity, and also to cause a naturally occurring convective air current that moves the unconverted thermal energy from the interior cavity through the funnel-shaped outlet opening to the thermal power system. In another specific embodiment, a molten salt-based thermal storage system is operably coupled to the funnel-shaped outlet of the box-like enclosure that includes a receiver for storing the unconverted thermal energy passed out of the interior cavity, and corresponding mechanisms (e.g., a boiler, a turbine, a generator, and a steam condenser) are connected to the receiver and serve to convert the stored thermal energy into said secondary electric power. Various additional features discussed above are utilized in the solar-tower power harvesting system to further maximize efficiency (e.g., utilizing multiplexed bull's eye structures, utilizing an all-refractor-metal box-like structure, and matching the fixed grating periods of the bull's eye structures to the optimal conversion frequency of the associated PV cells).

BRIEF DESCRIPTION OF THE DRAWINGS

These and other features, aspects and advantages of the present invention will become better understood with regard to the following description, appended claims, and accompanying drawings, where:

DETAILED DESCRIPTION OF THE DRAWINGS

The present invention relates to an improved solar power harvesting system that utilizes a TPV converter. The following description is presented to enable one of ordinary skill in the art to make and use the invention as provided in the context of a particular application and its requirements. As used herein, directional terms such as "upper", "upward", "lower", "downward", "over", "under", "front" and "rear", are intended to provide relative positions for purposes of description, and are not intended to designate an absolute frame of reference. In addition, the phrases "integrally formed" and "integrally connected" are used herein to describe the connective relationship between two portions of a single fabricated or machined structure, and are distinguished from the terms "connected" or "coupled" (without the modifier "integrally"), which indicates two separate structures that are joined by way of, for example, adhesive, fastener, clip, or movable joint. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
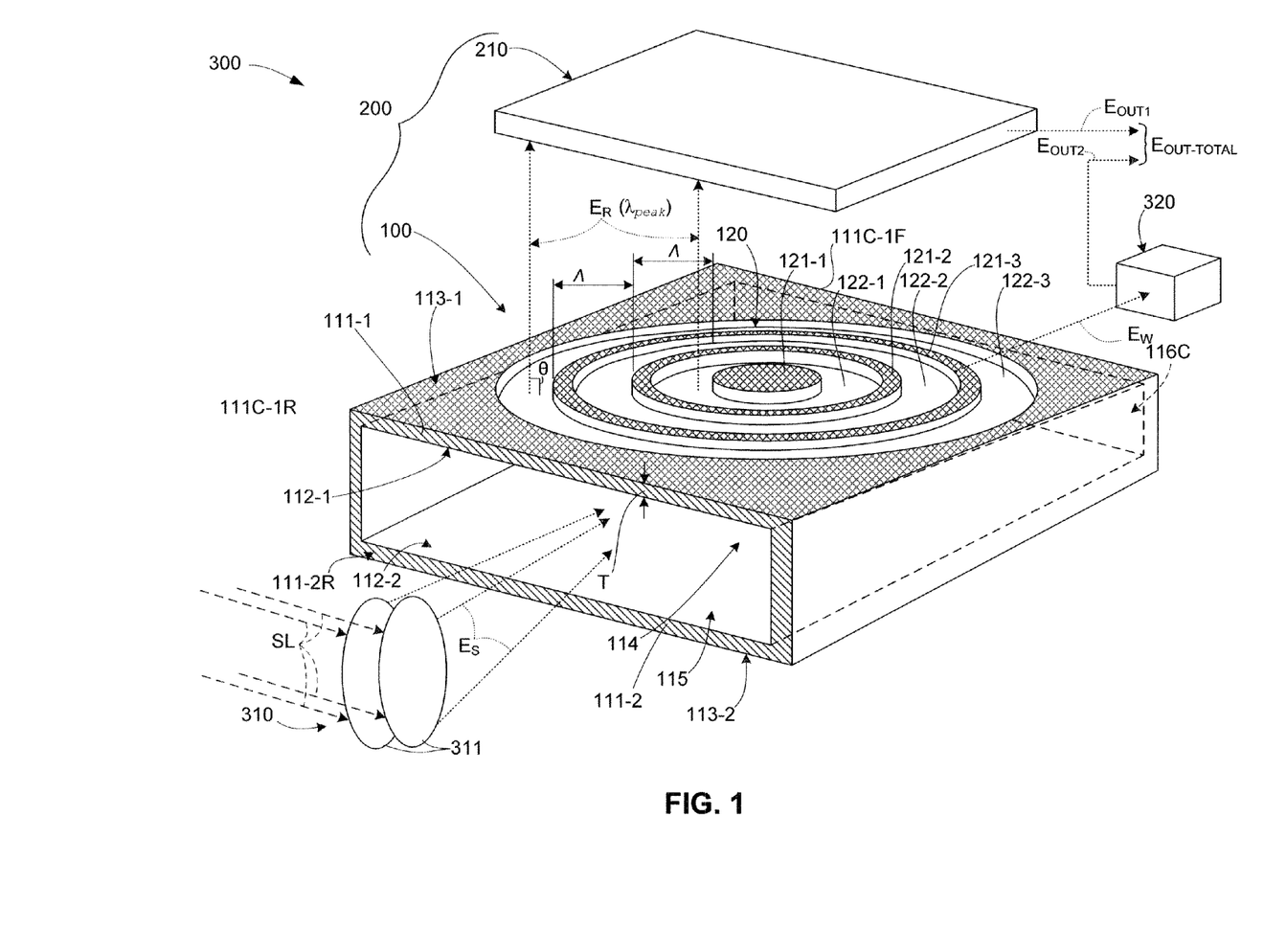
FIG. 1 is a perspective view showing a simplified solar power harvesting system according to an embodiment of the present invention.

FIG. 1 shows a simplified solar power harvesting system 300 of the present invention including a sunlight concentrating system 310, a TPV converter 200 including a spectrally-selective metamaterial emitter 100 and an associated PV cell 210, and a thermal power system 320 that combine to generate electrical energy $E_{E\text{-}TOTAL}$ with efficiencies that are much higher than is possible using conventional approaches. Sunlight concentrating system 310 utilizes one or more optical systems detailed below to provide concentrated sunlight (solar energy) $E_S$ to TPV converter 200. TPV converter 200 utilizes spectrally-selective metamaterial emitter 100 and associated PV cell 210 to convert solar energy $E_S$ into primary electrical energy $E_{E1}$ with an efficiency that is significantly higher than that achieved by conventional TPV conversion approaches, and under certain operating conditions detailed below can reach 25% or higher. Thermal power system 320 enhances overall system efficiency by converting residual thermal energy $E_W$ (i.e., unconverted solar energy in the form of "waste" heat) into secondary electrical energy $E_{E2}$. By combining the high efficiency of TPV converter 200 with a high efficiency thermal power system 320, solar power harvesting system 300 generates total electrical energy $E_{E\text{-}TOTAL}$ (i.e., the combination of primary electrical energy $E_{E1}$ and secondary electrical energy $E_{E2}$) with an efficiency of 42% or higher.

The various components of solar power harvesting system 300 are now described in additional detail.

Referring to the lower left corner of FIG. 1, sunlight concentrating system 310 utilizes one or more optical elements 311 to generate concentrated sunlight (solar energy) $E_S$ such that TPV converter 200 receives concentrated sunlight (solar energy) $E_S$ with an intensity greater than one-hundred (100) suns. For simplicity, optical elements 311 are depicted in FIG. 1 by lenses that focus and redirect sunlight beams SL onto TPV converter 200. In a presently preferred embodiment, sunlight concentrating system 310 is a ground-based heliostat including flat mirrors (optical elements) that are controlled using know techniques to track the sun's position such that reflected sunlight is directed toward TPV converter 200. In other possible embodiments, optical elements 311 may include other flat mirror arrangements or curved mirrors to generate concentrated $E_S$.

Referring to TPV converter 200 (located in the center of FIG. 1), metamaterial emitter 100 includes a box-like enclosure 110 on which is formed at least one bull's eye structure 120 that generates a radiant energy beam $E_R$ in the manner described below, and associated PV cell 210 is fixedly disposed adjacent to metamaterial emitter 100 such that it receives radiant energy beam $E_R$.

Box-like enclosure 110 includes a peripheral wall 111 defining (surrounding) an interior cavity 114 having an inlet opening 115, and is fixedly disposed relative to sunlight concentrating system 310 such that, during operation, concentrated sunlight $E_S$ is directed through inlet opening 115 and is thus supplied into interior cavity 114. Peripheral wall 111 includes an upper (first) peripheral wall portion 111-1 and a lower (second) peripheral wall portion 111-2 that are connected by respective side wall portions 111-3 and 111-4 such that peripheral wall portions 111-1 and 111-2 are disposed in an opposing spaced-apart (e.g., parallel) relationship, whereby a substantially rectangular interior cavity 114 is defined between wall portions 111-1 and 111-2. Peripheral wall portions 111-1 and 111-2 respectively include inward-facing surface portions 112-1 and 112-2 that face interior cavity 114C, and outward-facing surfaces 113-1 and 113-2 that face away from interior cavity 114 (i.e., upward and downward, respectively, from box-like enclosure 110). Peripheral wall portions 111-1 and 111-2 also extend between an inlet end 110-1 and an outlet end 110-2 of box-like enclosure 110, with inlet opening 115 being defined between respective front end portions 111-1F and 111-2F of peripheral wall portions 111-1 and 111-2, and an outlet opening 116 being defined between respective rear end portions 111-1R and 111-2F of peripheral wall portions 111C-1 and 111C-2. To facilitate the fabrication of bull's eye structure 120 using photolithography, upper wall portion 111-1 is a planar, solid (plate-like) substrate formed such that lower (first) surface 112-1 and opposing upper (second) surface 113-1 are parallel planar surfaces. In addition, for reasons set forth below, base substrate 111 is preferably entirely constructed from metal, and more preferably is entirely constructed using one or more refractory metals (e.g., Rhenium, Tantalum, or Tungsten), or a refractory metal alloy (e.g., Rhenium alloy). In an exemplary practical exemplary embodiment (e.g., when used as part of TPV system 200), base substrate 111-1 has a thickness T on the order of more than a wavelength of emitted radiant energy $E_R$ (described below), but may have any arbitrary thickness outside of this constraint.

Referring to the upper portion of box-like enclosure 110, bull's eye structure 120 includes concentric circular ridge structures 121-1, 121-2 and 121-3 that are integrally formed on upper surface 113-1 of upper wall portion (base substrate) 111-1 and respectively separated by intervening circular grooves 122-1, 122-2 and 122-3 that extend into (but not through) upper wall portion 111-1. In particular, circular ridge structures 121-1, 121-2 and 121-3 are either formed from the same material as upper wall portion 111-1 (e.g., by utilizing a subtractive process such as etching) or formed by an additive process such as sputtering that effectively melds (fuses) the added material to the base substrate material). Concentric ridge structures 121-1, 121-2 and 121-3 are formed such that each adjacent pair of ridge structures is separated by a fixed grating period (pitch distance) Λ. For example, ridge structures 121-1 and 121-2 are separated by circular groove 122-1 such that the distance between an outside edge of ridge structure 121-1 and outside edge of ridge structure 121-2 is equal to the grating period Λ. Similarly, ridge structures 121-2 and 121-3 are separated by circular groove 122-2 such that the distance between an outside edge of ridge structure 121-2 and outside edge of ridge structure 121-3 is equal to the same grating period Λ as that separating ridge structures 121-1 and 121-2.

According to an aspect of the present invention, bull's eye structure 120 is configured such that, when solar energy $E_S$ is sufficient to heat box-like enclosure 110 to a temperature above 1000° K, radiant energy $E_R$ is emitted from upper surface 113-1 having a peak emission wavelength $\lambda_{peak}$ that is roughly equal to (i.e., within 25% of) fixed grating period Λ. According to another aspect of the present invention, bull's eye structure 120 is configured such that emitted radiant energy beam $E_R$ is highly directional (i.e., 90% of the emitted radiant energy is within 0.5° of perpendicular (angle θ) to the planar outward-facing surface 113), narrow band (i.e., the full-width at half maximum of the emitted radiant energy is within 10% of peak emission wavelength $\lambda_{peak}$), and peak emission wavelength $\Lambda_{peak}$ that is roughly equal to the fixed grating period Λ separating each adjacent pair of concentric circular ridge structures (i.e., the peak emission wavelength is within 25% of the grating period Λ). Accordingly, metamaterial emitter 100 is selectively "tunable" (adjustable) by way of adjusting the fixed grating period Λ separating the concentric circular ridge structures 121-1 to 121-3. A relationship between the specific geometric dimensions associated with bull's eye structure 120 and the characteristics of emitted radiant energy beam $E_R$ are explained in additional detail in co-owned and co-pending U.S. patent application Ser. No. 14/180,333, entitled "SPECTRALLY-SELECTIVE METAMATERIAL EMITTER", which is incorporated herein by reference in its entirety.

According to an aspect of the present invention, PV cell 210 is fixedly disposed adjacent to metamaterial emitter 100 such that radiant energy beam $E_R$ is directed onto PV cell 210, whereby PV cell 210 converts radiant energy beam $E_R$ into primary electrical energy $E_{E1}$ using known photovoltaic techniques. According to an embodiment of the present invention, bull's eye structure 120 is configured to generate radiant energy beam $E_R$ with an emission wavelength that is matched to the optimal conversion spectrum of PV cell 120. That is, although bull's eye structure 120 can include grating periods of almost any size, ridge structures 121-1 to 121-3 typically have a grating period Λ in the range of 10 nanometers and 5.0 microns, which corresponds with the absorption curves of most commercially available PV cells (i.e., in the range of 0.5 microns to 3 microns). In a particularly preferred embodiment (e.g., when PV cell 210 is a GaSb PV cell having an optimal wavelength range of said PV cell is 1.0 microns to 2.0 microns), emitter 100 is produced with a grating period Λ in the range of 0.5 microns and 3.0 microns. As is known in the art, PV cell 120 converts "in-band" photons (i.e., photons having energies within the specific optimal conversion spectrum of PV cell 120) at a higher efficiency than "out-of-band" photons (i.e., photons having energies outside the optimal conversion spectrum). To improve the efficiency of TPV converter 200, bull's eye structure 120 is configured to "match" the EQE curve of PV cell 120 by forming bull's eye structure 120 with at least one fixed grating period Λ that is roughly equal to the wavelength of an "in-band" photon that is within the optimal absorption spectrum of PV cell 120. Accordingly, when metamaterial emitter 100 is heated to a temperature above 1000° K, bull's eye structure 120 generates radiant energy beam $E_R$ with a peak emission wavelength $\lambda_{peak}$ that is within the optimal conversion spectrum of PV cell 120, whereby the spectrally-selective metamaterial emitter 100 is "matched" to the associated PV cell 210 in the sense that a high percentage of the photons forming the radiant energy beam $E_R$ are absorbable/convertible by PV cell 120. Further, when metamaterial emitter 100 is heated to a temperature above 1400° K, the overall efficiency of TPV converter 200 is increased to 25% or higher.

Additional details regarding TPV converter 200 are described in co-owned and co-pending U.S. patent application Ser. No. 14/180,341, entitled "Metamaterial Enhanced Thermophotovoltaic Converter", which is incorporated herein by reference in its entirety.

Referring to the right side of FIG. 1, thermal power system 320 is positioned to receive unconverted thermal energy ("waste" heat energy) $E_W$ passed from the interior cavity 114 of the box-like enclosure 110 through outlet opening 116, and includes suitable mechanisms that convert thermal energy $E_W$ into secondary electric power $E_{E2}$. In a generalized exemplary embodiment, thermal power system 320 utilizes a heat exchanger that converts thermal energy $E_W$ to steam, and a generator that converts the steam into secondary electric power $E_{E2}$ according to known techniques. In a preferred embodiment, thermal power system 320 is implemented using a high efficiency thermal power system (e.g., using a molten salt loop receiver). By combining TPV converter 200 with a suitable high efficiency thermal power system 320, the overall efficiency of solar power harvesting system 300 reaches 42% or higher.

According to alternative embodiments, the performance of TPV converter 200 is enhanced using one or more features presented in the specific embodiments described below with reference to FIGS. 2 to 5.

Figure 2:
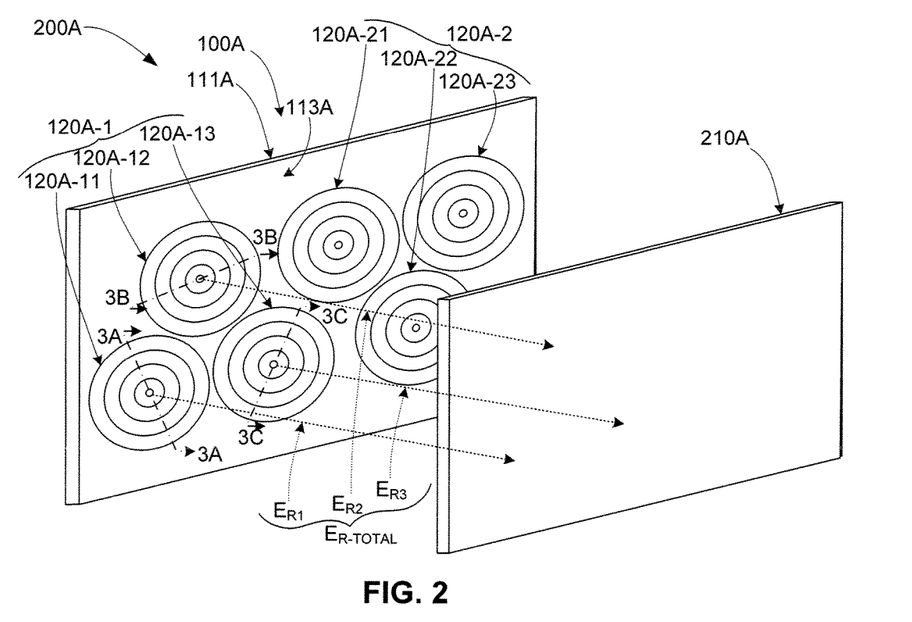
FIG. 2 is a perspective view showing a TPV converter utilized by a solar power harvesting system according to a second embodiment of the present invention.
Figure 3A:
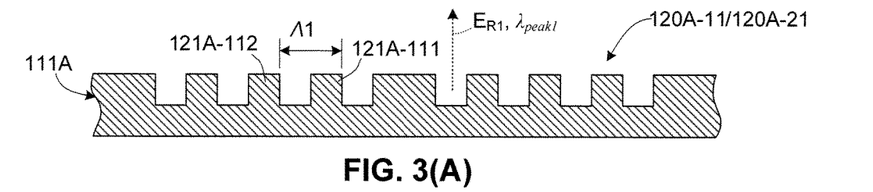
FIGS. 3(A), 3(B) and 3(C) are cross-sectional side views taken along section lines 3A-3A, 3B-3B and 3C-3C, respectively, of FIG. 2 showing bull's eye structures with different fixed grating periods.
Figure 3B:
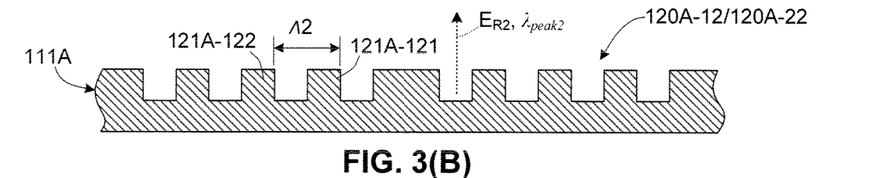
Figure 3C:
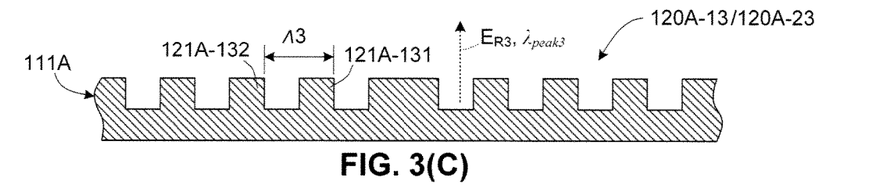

FIG. 2 is a simplified perspective view showing a partial TPV converter 200A including a metamaterial emitter 100A having multiple bull's eye structures 120A-11 to 120A-13 and 120A-21 to 120A-23 that are formed on a "target-facing" surface 113A of a base substrate 111A in a manner similar to that described above. FIGS. 3(A) to 3(C) are cross-sectional views taken along section lines 3A-3A, 3B-3B, and 3C-3C of FIG. 2. Metamaterial emitter 100A Metamaterial emitter 100A is characterized in that it utilizes multiple bull's eye structures arranged in sets of three, where each bull's eye structure of each set has a different fixed grating period to effectively broaden a total radiant energy beam $E_{R\text{-}TOTAL}$ emitted by the metamaterial emitter 100A. Referring to FIG. 2, the multiple bull's eye structures are arranged in two sets 120A-1 and 120A-2, where each set includes three bull's eye structures (i.e., set 120A-1 includes bull's eye structures 120A-11 to 120A-13, and set 120A-2 includes bull's eye structures 120A-21 to 120A-23). Each set 120A-1 and 120A-2 includes one bull's eye structure having grating period $\Lambda 1$, one bull's eye structure having grating period $\Lambda 2$, and one bull's eye structure having grating period $\Lambda 3$. Specifically, as indicated in FIG. 3(A), set 120A-1 includes structure 120A-11 having concentric circular ridge structures spaced at a fixed grating period $\Lambda 1$ (e.g., the distance between adjacent structures 121A-111 and 121A-112 is equal to grating period $\Lambda 1$). FIG. 3(A) also represents bull's eye structure 210A-22 of set 120A-2, which includes ridge structures having fixed grating period $\Lambda 1$ formed in the same manner depicted by adjacent structures 121A-111 and 121A-112. Similarly, FIG. 3(B) shows that both structure 120A-12 of set 120A-1 and structure 210A-22 of set 120A-2 have grating period $\Lambda 2$ (e.g., as depicted by adjacent structures 121A-121 and 121A-122, which are separated by grating period $\Lambda 2$), and FIG. 3(C) shows that both structure 120A-13 of set 120A-1 and structure 210A-23 of set 120A-2 have grating period $\Lambda 3$ (e.g., as depicted by adjacent structures 121A-131 and 121A-132, which are separated by grating period $\Lambda 3$).

The benefit of forming metamaterial emitter 100A with three different grating periods is that this approach can be used to selectively broaden the overall spectrum of the total radiant energy beam $E_{R\text{-}TOTAL}$ emitted by metamaterial emitter 100A to associated PV cell 210A. That is, because the radiant energy generated by a particular bull's eye structure is related to its fixed grating period, a broadened the total radiant energy beam $E_{R\text{-}TOTAL}$ is generated by emitter 100A (shown in FIG. 2) by utilizing three different grating periods $\Lambda 1$, $\Lambda 2$ and $\Lambda 3$. For example, assume fixed grating period $\Lambda 3$ is larger than fixed grating period $\Lambda 2$, and fixed grating period $\Lambda 2$ is larger than fixed grating period $\Lambda 1$. As indicated in FIGS. 3(A) to 3(C), these different grating periods generate component radiant energy beams to having different peak emission wavelengths. That is, because fixed grating period $\Lambda 3$ is greater than fixed grating period $\Lambda 2$, component radiant energy beams $E_{R3}$ emitted from bull's eye structures 120-13 and 120-23 have a peak emission wavelength $\lambda_{peak3}$ that is greater than a peak emission wavelength $\lambda_{peak2}$ of radiant energy $E_{R2}$ generated by bull's eye structures 120-12 and 120-22. Similarly, the peak emission wavelength $\lambda_{peak2}$ of radiant energy beam $E_{R2}$ is greater than a peak emission wavelength $\lambda_{peak1}$ of radiant energy $E_{R1}$ generated by bull's eye structures 120-11 and 120-21). Referring again to FIG. 2, the total radiant energy beam $E_{R\text{-}TOTAL}$ is a combination of component radiant energy beams $E_{R1}$, $E_{R2}$ and $E_{R3}$, and the effect of combining the adjacent narrowband spectra of component beams $E_{R1}$, $E_{R2}$ and $E_{R3}$ is to broaden the overall spectrum of total radiant energy beam $E_{R\text{-}TOTAL}$. This approach can be used, for example, to provide more in-band photons to associated PV cell 210A, and consequently to increase the output power density of TPV converter 200A.

The approach set forth above with reference to FIGS. 2 and 3(A) to 3(C) is extendible to any number of fixed grating periods in order to selectively broaden the overall spectrum of a total radiant energy beam. That is, although the approach is described with reference to six bull's eye structures disposed in two sets of three that utilize three different grating periods, it is understood that the approach is extendable to any number of bull's eye structures disposed in any number of sets of two or more bull's eye structures. For example, a metamaterial emitter may include only two grating periods to facilitate the emission of a relatively narrow emission spectrum, or a spectrum having two separated "peak" emission wavelengths. Alternatively, the use of a large number of grating periods facilitates the emission of a relatively broad emission spectrum. It is also possible to fabricate a metamaterial emitter that in which all bull's eye structures have a unique fixed grating period (i.e., no two bull's eye structures have the same grating period). Unless otherwise specified, the appended claims are intended to cover all of the above-mentioned combinations of different grating periods.

Figure 4:
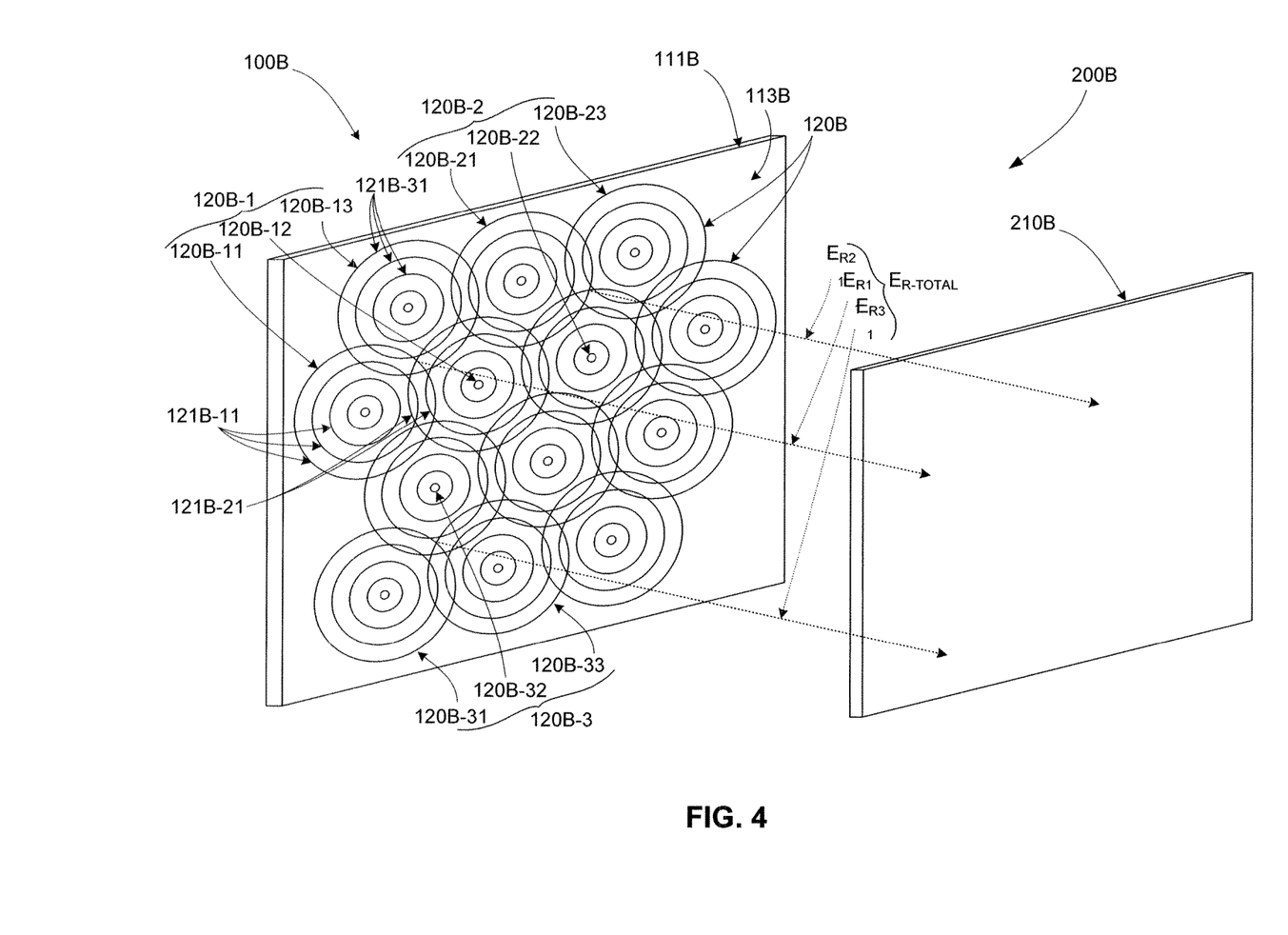
FIG. 4 is a perspective view showing a TPV converter utilized by a solar power harvesting system according to a third embodiment of the present invention.

FIG. 4 is a perspective view showing a TPV converter 200B having a metamaterial emitter 100B and a PV cell 210B, where metamaterial emitter 100B includes multiple bull's eye structures formed on a "target-facing" surface 113B of a base substrate 111B in a manner similar to that described above. Metamaterial emitter 100B differs from the previous embodiments in that the multiple bull's eye structures are formed in a "multiplexed" (overlapping) pattern (i.e., such that at least some of the circular ridge structures of one bull's eye structure intersect at least some of the circular ridge structures of at least one adjacent bull's eye structure). For example, referring to the upper left corner of FIG. 4, bull's eye structure 120B-11 includes a first group of concentric circular ridge structures 121B-11, and adjacent bull's eye structure 120B-12 includes a second group of concentric circular ridge structures 121-12. Bull's eye structures 120B-11 and 120B-12 form a multiplexed pattern in that at least some of circular ridge structures 121B-11 of bull's eye structure 120B-11 intersect (overlap) at least some of circular ridge structures 121B-12 of bull's eye structure 120B-12. This multiplex pattern serves to concentrate radiant energy $E_{R\text{-}TOTAL}$ emitted by metamaterial emitter 100B, which can be used, for example, to provide more in-band photons to PV cell 210B, and consequently to increase the output power density of TPV converter 200B.

According to a presently preferred embodiment, in addition to the multiplexed pattern, metamaterial emitter 100B is also fabricated to employ the multiple-grating-period approach described above with reference to FIG. 2 (i.e., such that at least one bull's eye structure has a fixed grating period that is different (e.g., larger) than the fixed grating period of another bull's eye structure). By way of example, the various multiplexed bull's eye structures of metamaterial emitter 100B are shown as being arranged in three sets: a first set 120B-1 including bull's eye structures 120B-11, 120B-12 and 120B-13, a second set 120B-2 including bull's eye structures 120B-21, 120B-22 and 120B-23, and a third set 120B-3 including bull's eye structures 120B-31, 120B-32 and 120B-33. Each set includes one bull's eye structure having a common first grating period (i.e., bull's eye structures 120B-11, 120B-21 and 120B-31 are fabricated using the same grating period in the manner described above with reference to FIG. 3(A)), one bull's eye structure having a second grating period (i.e., bull's eye structures 120B-12, 120B-22 and 120B-32 are fabricated in the manner described above with reference to FIG. 3(B)), and one bull's eye structure having a third grating period (i.e., bull's eye structures 120B-13, 120B-23 and 120B-33 are fabricated in the manner described above with reference to FIG. 3(B)). With this arrangement, metamaterial emitter 100B generates total radiant energy $E_{R\text{-}TOTAL}$ that both concentrates and combines adjacent narrowband spectra to produce a high energy emission with a broader overall spectrum that maximizes the number of in-band photons supplied to PV cell 210B, thereby maximizing the output power density of PV cell 210B.

Figure 5:
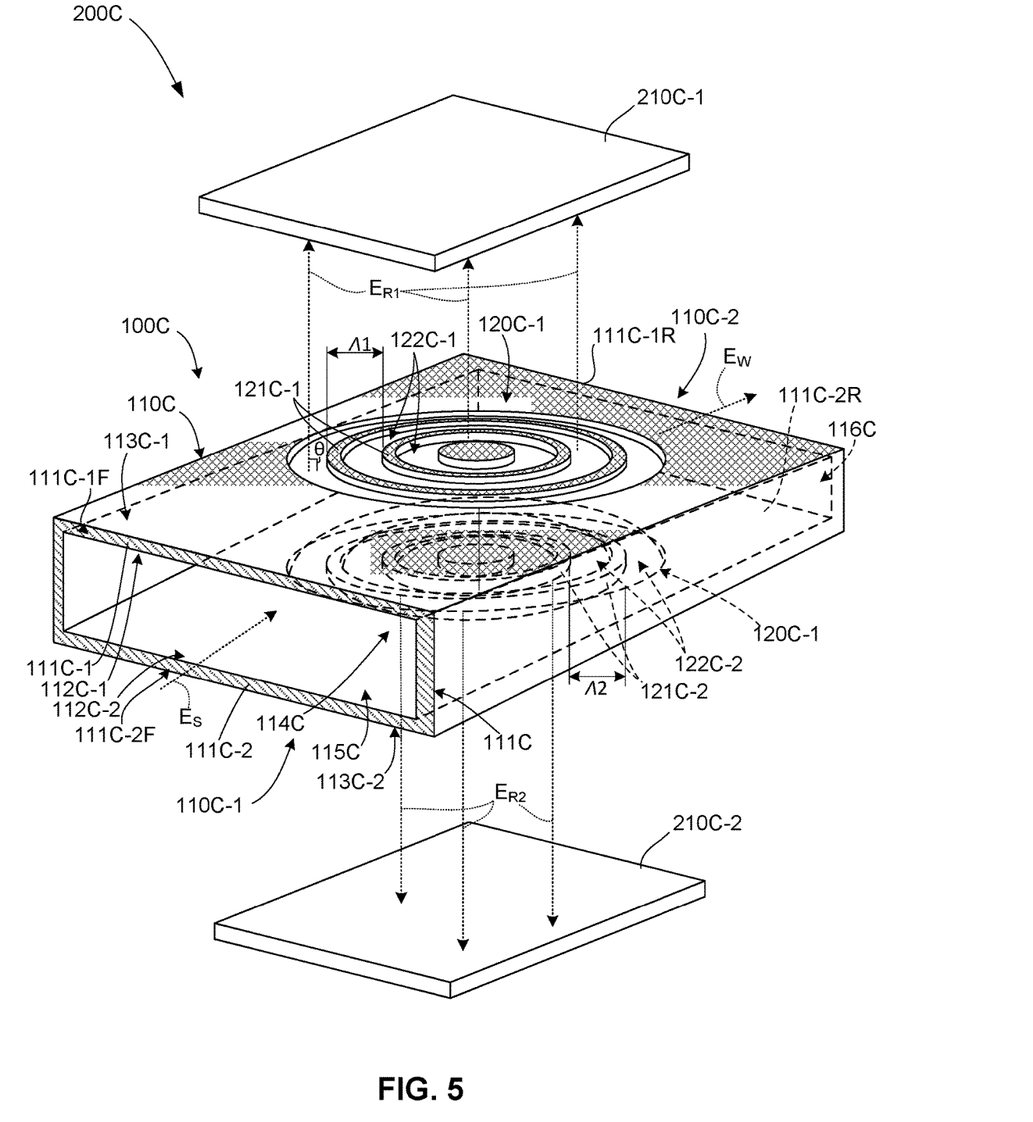
FIG. 5 is a perspective view showing a TPV converter utilized by a solar power harvesting system according to a fourth embodiment of the present invention.

FIG. 5 is a perspective view showing a TPV converter 200C including a metamaterial emitter 100C and two PV cells 2100-1 and 210C-2. In this embodiment, the "base substrate" of TPV converter 200C is formed as part of a box-like enclosure 110C that facilitates achieving optimal high operating temperatures (i.e., 1000° K to 1500° K). Box-like enclosure 110C includes a peripheral wall 111C having an upper (first) peripheral wall portion 111C-1 and a lower (second) peripheral wall portion 111C-2 that are connected by respective side wall portions in an opposing spaced-apart (e.g., parallel) relationship such that a substantially rectangular interior cavity 114C is defined between wall portions 111C-1 and 111C-2. Peripheral wall portions 111C-1 and 111C-2 respectively include inward-facing surface portions 112C-1 and 112C-2 that face an interior cavity 114C, and outward-facing surfaces 113C-1 and 113C-2 that face away from interior cavity 114C (i.e., upward and downward, respectively, from box-like enclosure 110C). Peripheral wall portions 111C-1 and 111C-2 extend between an inlet end 110C-1 and an outlet end 110C-2 of box-like enclosure 110C such that an inlet opening 115C is defined between respective front end portions 111C-1R and 111C-2R of peripheral wall portions 111C-1 and 111C-2, and an outlet opening 116C is defined between respective rear end portions 111C-1F and 111C-2R of peripheral wall portions 111C-1 and 111C-2. During operation, "source" heat energy $E_S$ is supplied into the interior cavity 114C through inlet opening 115C, and "waste" heat energy is evacuated through outlet opening 116C.

Metamaterial emitter 100C includes two bull's eye structures 120C-1 and 120C-2 formed in the manner described above that are disposed on outward facing surfaces 113C-1 and 113C-2, respectively. Specifically, bull's eye structure 120C-1 is disposed on upward-facing surface 113C-1 of upper peripheral wall portion 111C-1 and includes concentric circular ridge structures 121C-1 separated by intervening circular grooves 1220-1 and separated by a fixed grating period Λ1, and bull's eye structure 120C-2 is disposed on downward-facing surface 113C-2 of lower peripheral wall portion 111C-2 and includes concentric circular ridge structures 121C-2 separated by intervening circular grooves 122C-2 and separated by a fixed grating period Λ2. In one specific embodiment, PV cells 210C-1 and 210C-2 are essentially identical (i.e., having the same spectral response), so fixed grating period Λ2 is the same as fixed grating period Λ1. In an alternative embodiment, PV cells 210C-1 and 210C-2 have different spectral responses, so fixed grating period Λ2 is different from (e.g., larger or smaller than) fixed grating period Λ1. With this arrangement, when heat energy $E_S$ is supplied into the interior cavity 114C and is sufficient to heat peripheral wall 111C to a temperature above 1000° K, radiant energy $E_{R1}$ is emitted upward from box-like enclosure 110C having a peak emission wavelength that is roughly equal to the fixed grating period Λ1 for conversion to electricity by PV cell 210C-1. At the same time, heat energy $E_S$ causes bull's eye structure 120C-2 to emit radiant energy $E_{R2}$ downward from box-like enclosure 110C to PV cell 210C-2, where radiant energy $E_{R2}$ has a peak emission wavelength that is roughly equal to the fixed grating period Λ2.

The box-like enclosure arrangement of metamaterial emitter 100C provides optimal energy beam generation because flat/planar peripheral wall portions 111C-1 and 111C-2 facilitate cost-effective fabrication of the bull's eye structures thereon (e.g., using existing photolithographic fabrication techniques), and because rectangular-shaped interior cavity 114C facilitates the efficient transfer of heat energy over the "base substrate" formed by peripheral wall portions 111C-1 and 111C-2. In one embodiment, the rectangular box-like arrangement facilitates the transfer of heat energy in the form of concentrated sunlight that reflects between the opposing upper and lower interior surfaces 112C-1 and 112C-2, thereby heating peripheral wall portions 111C-1 and 111C-2, and allowing associated waste heat to be removed from interior cavity 114C through outlet opening 116C. Moreover, because electricity is being generated by two PV cells 210C-1 and 210C-2 instead of just one (as in the generalized embodiments set forth above), this arrangement allows TPV converter 200C to provide increased electricity generation over a single PV cell approach. In yet another embodiment (not shown), the gist of this approach is further expanded to employ additional bull's eye structures and additional PV cells (e.g., disposed along the sides of box-like enclosure 110C, or along multiple surfaces of a non-rectangular box-shaped enclosure) to potentially further increase electricity generation.

According to an aspect of the invention, box-like enclosure 110C is constructed as an all-metal structure (e.g., constructed from a single metal block or by welding or otherwise securing four metal plates together). The all-metal structure facilitates achieving the required high operating temperatures (i.e., 1000 to 1500° K) over a suitable operating lifetime of metamaterial emitter 100C. In a specific embodiment, the all-metal box-like enclosure 110C is formed entirely using one or more refractory metals (e.g., Rhenium, Tantalum or Tungsten) or refractory metal alloys to further enhance the enclosure's operational lifetime.

Figure 6:
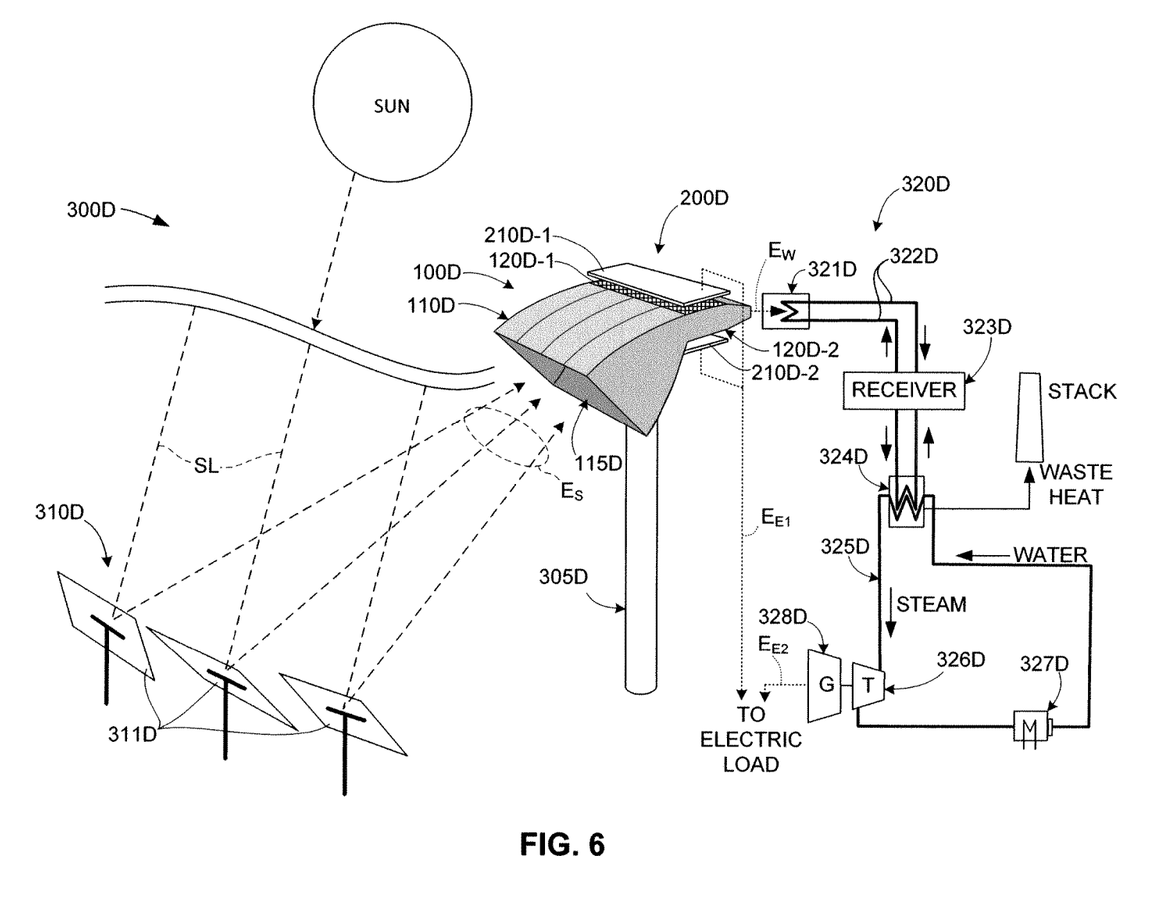
FIG. 6 is a diagram showing a solar tower power harvesting system according to a fifth embodiment of the present invention.

FIG. 6 is a simplified diagram showing a solar tower power harvesting system 300D utilizing both a TPV converter 200D disposed on a tower 305D, a heliostat-type solar concentrating system 3100, and a conventional steam production-type thermal power system 320D. TPV converter 200D, which is described in additional detail below, includes a metamaterial emitter 100D comprising a box-like enclosure 110D that is mounted to the top of tower 305D, and includes corresponding bull's eye structure arrays 120D-1 and 120D-2 and corresponding PV cells 210D-1 and 210D-2 that function as described herein to generate primary electrical energy $E_{E1}$. Heliostat-type solar concentrating system 310D includes an array of mirrors 311D (only three are shown for illustrative purposes) disposed at ground level in a designated (e.g., 100 meter by 100 meter) area next to tower 305D, and a control system (not shown) that controls mirrors 311D to track the sun's movement during daylight hours using known techniques in order to reflected sunlight through an inlet opening 115D of box-like enclosure 110D. Thermal power system 320D includes a primary heat exchange unit 321D that is connected to an associated receiver 323D by way of a first conduit 322D, a steam generating (secondary heat exchange) unit 324D connected to the receiver/pump 323D, a turbine 326D that is coupled by way of conduit 325D to receive steam from steam generating unit 324D, a steam condenser 327D, and a generator 328D driven by turbine 236D to generate secondary electrical energy $E_{E2}$. A heat transfer fluid is circulated by way of conduits 3322D to be heated in primary heat exchange unit 321D by waste heat exiting box-like enclosure 110D. The heated fluid is optionally stored in receiver 323D, and circulated through steam generating unit 324D to generate steam at a suitable temperature (e.g., 550° C.). The steam is then passed by way of conduits 325D to drive turbine 326D, which in turn drives generator 328D.

Figure 7A:
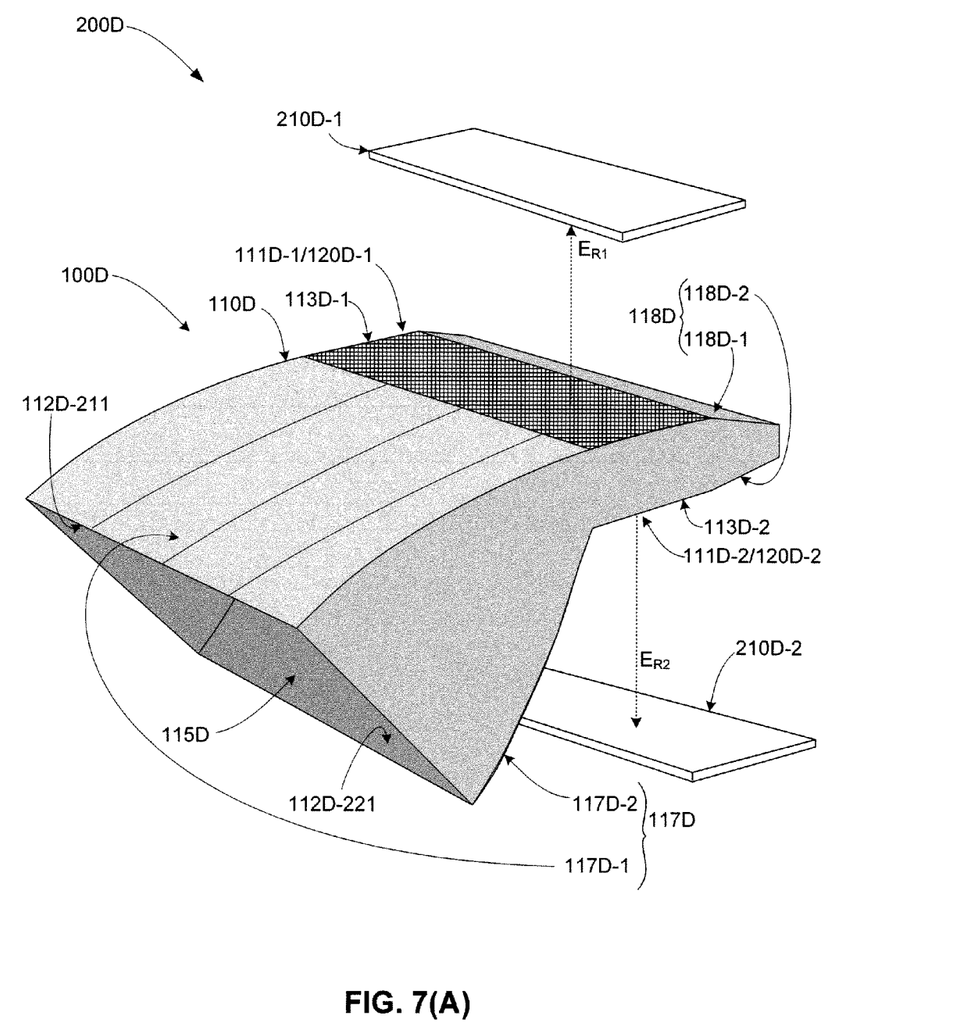
FIGS. 7(A) and 7(B) are perspective and cross-sectional side views, respectively, showing a TPV converter utilized in the solar tower power harvesting system of FIG. 6.
Figure 7B:
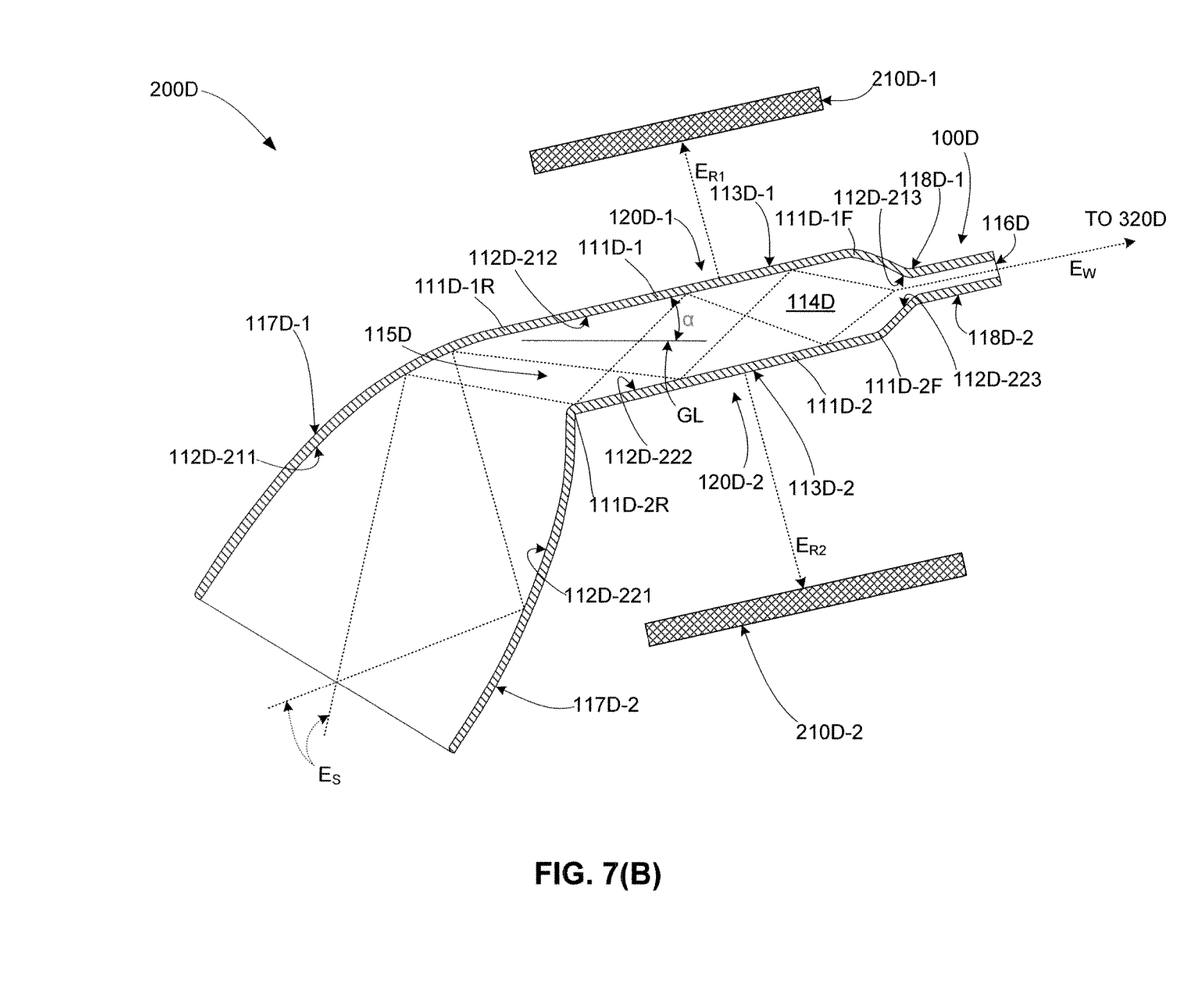

FIGS. 7(A) and 7(B) are perspective and cross-sectional side views showing metamaterial emitter 100D of TPV converter 200D in additional detail. Metamaterial emitter 100D is similar to that described above with reference to FIG. 5 in that box-like enclosure 110D includes opposing upper (first) and lower (second) peripheral wall portions 111D-1 and 111D-2 that are connected by respective side wall portions in an opposing spaced-apart (e.g., parallel) relationship, and such that arrays 120D-1 and 120D-2 of bull's eye structures are respectively formed on outward-facing surfaces 113D-1 and 113D-2 of wall portions 111D-1 and 111D-2. Bull's eye structure arrays 120D-1 and 120D-2 are implemented using any of the various arrangements described above, but preferably include a multiplexed arrangement such as that shown in FIG. 4 to maximize the amount of energy transmitted in emitted radiant energy beams $E_{R1}$ and $E_{R2}$.

Metamaterial emitter 100D differs from previous embodiments in that it includes a compound parabolic trough 117D disposed at the inlet end of box-like enclosure 110D. As indicated in FIG. 7(B), the compound parabolic trough includes an upper (first) compound parabolic trough structure 117D-1 integrally connected to a front end portion 111D-1F of upper peripheral wall portion 111D-1, and a lower (second) compound parabolic trough structure 117D-2 integrally connected to a front end portion 111D-2F of lower peripheral wall portion 111D-2. As indicated by the dashed-line arrows in FIG. 7(B), compound parabolic trough structures 117D-1 and 117D-2 are operably shaped to channel concentrated sunlight $E_S$ through the inlet opening 115D into interior cavity 1140 between peripheral wall portions 111D-1 and 111D-2 such that the sunlight reflects between the inside surfaces 112D-212 and 112D-222 of peripheral wall portions 111D-1 and 111D-2 in a manner that maximizes the transfer of heat energy to bull's eye structure arrays 1200-1 and 120D-2, which in turn maximizes the amount of radiant energy emitted in beams $E_{R1}$ and $E_{R2}$ respectively emitted from bull's eye structure arrays 120D-1 and 120D-2 to PV cells 210D-1 and 210D-2, respectively.

Metamaterial emitter 100D also differs from previous embodiments in that it includes a funnel-shaped outlet 117D disposed at the outlet end of box-like enclosure 110D that serves to control the release of "waste" heat from interior cavity 114D. As indicated in FIG. 7(B), the funnel-shaped outlet includes an upper (first) funnel-shaped outlet structure 118D-1 integrally connected to a rear end portion 111D-1R of upper peripheral wall portion 111D-1, and a lower (second) funnel-shaped outlet structure 118D-2 integrally connected to a rear end portion 111D-2R of lower peripheral wall portion 111D-2. As indicated by the dashed-line arrows in FIG. 7(B), funnel-shaped outlet structures 118D-1 and 118D-2 are operably shaped to channel "waste" heat energy $E_W$ from interior cavity 114D through outlet opening 116D at a rate that optimizes energy transfer to bull's eye structure arrays 120D-1 and 120D-2.

For reasons similar to those set forth above (e.g., to minimize thermal cycling stresses and to maximize the operating lifetime) the entirety of all-metal box-like enclosure 110D (i.e., including peripheral wall portions 111D-1 and 111D-2, compound parabolic trough structures 117D-1 and 117D-2, and funnel-shaped outlet structures 118D-1 and 118D-2) is constructed using metal, and more preferably using a single refractory metal (e.g., Rhenium, a Rhenium alloy, Tantalum or Tungsten).

Referring to FIG. 7(B), according to a specific embodiment, box-like enclosure 110D is maintained at a tilted angle α relative to ground level GL in order to facilitate transfer of solar energy into interior cavity 114D, and also to cause a naturally occurring convective air current that moves the unconverted thermal energy $E_W$ from the interior cavity 114D through outlet opening 116D to thermal power system 320D (not shown). In particular, box-like enclosure 110D is maintained such that outlet opening 116D and funnel-shaped outlet structures 118D-1 and 118D-2 are higher (i.e., further from ground level) than inlet opening 115D compound parabolic trough structures 117D-1 and 117D-2.

Figure 8:
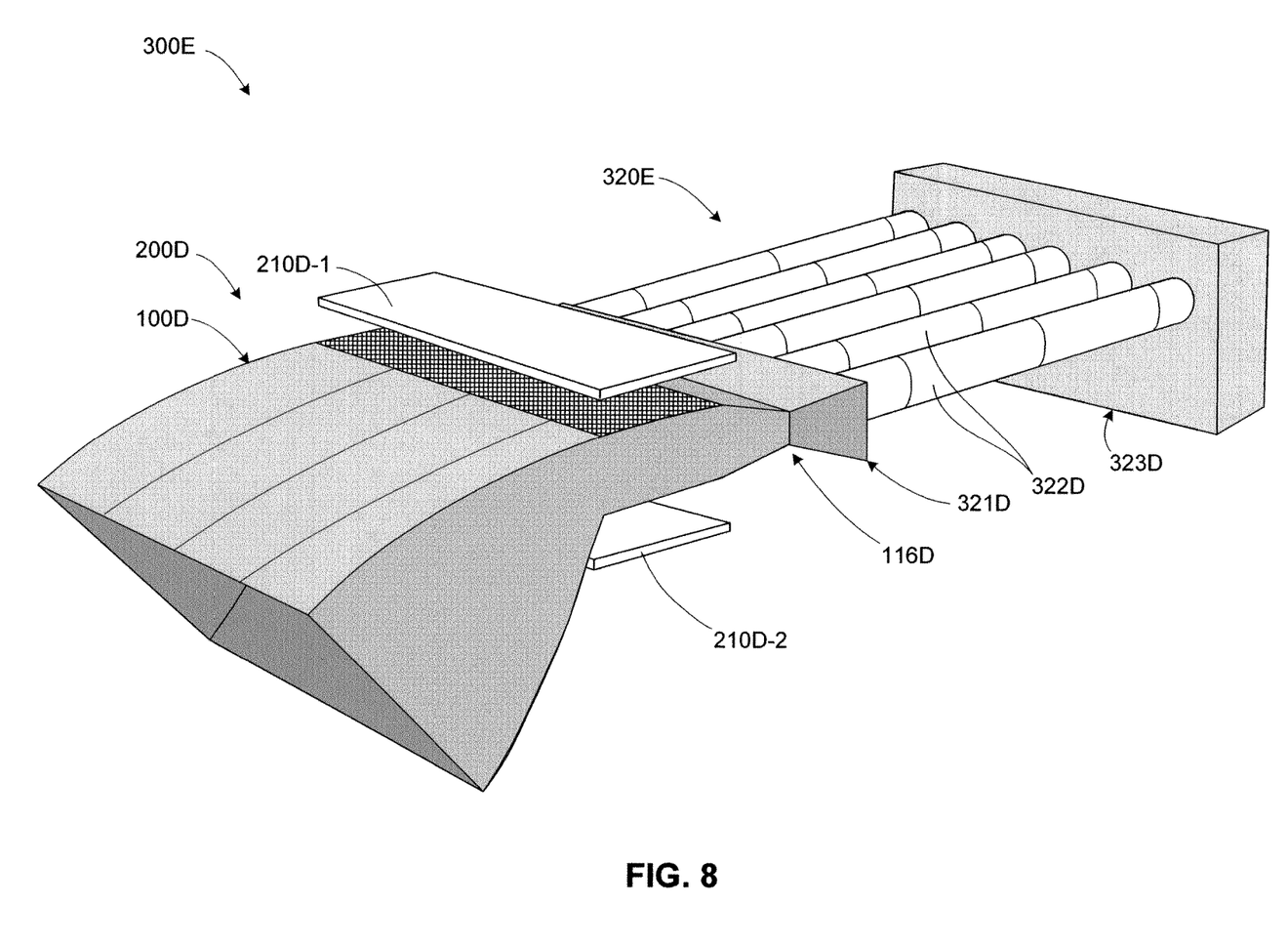
FIG. 8 is a perspective view showing a partial solar power harvesting system according to a sixth embodiment of the present invention.

FIG. 8 shows a portion of a solar power system 300D according to another specific embodiment. Solar power system 300D is similar to the previous embodiment in that it utilizes TPV converter 200D (i.e., metamaterial emitter 100D and matched PV cells 210D-1 and 210D-2, described above) to generate primary electrical energy. Solar power system 300D differs from the previous embodiment in that it includes a thermal power system 320E implemented using a molten salt loop system, such as that used by Sandia National Laboratories in Livermore, Calif., USA, in which molten salt is pumped between a receiver 323D and a heat exchanger 321D by way of conduits 322D. Heat exchanger 321d is operably thermally coupled to metamaterial emitter 110D such that waste heat exiting by way of outlet opening 116D is transferred to the circulating molten salt. The molten salt is an excellent energy storage media, which can then be collected in large storage vessels for later use to generate secondary electrical energy with high efficiency.

Although the present invention has been described with respect to certain specific embodiments, it will be clear to those skilled in the art that the inventive features of the present invention are applicable to other embodiments as well, all of which are intended to fall within the scope of the present invention. For example, the solar tower power harvesting system shown in FIG. 6 may be modified to utilize bull's eye structure arrays according to any of the approaches described with reference to FIGS. 2 to 5.

The invention claimed is:
1. A solar power harvesting system comprising:
   a sunlight concentrating system for generating concentrated sunlight;
   a solar thermophotovoltaic (TPV) converter including:
      a metamaterial emitter including:

a box-like enclosure at least partially formed by a peripheral wall including a first planar peripheral wall portion and a second planar peripheral wall portion separated by an interior cavity that extends between an inlet opening defined between first ends of said first and second planar peripheral wall portions and an outlet opening defined between second ends of said first and second planar peripheral wall portions, and at least one first bull's eye structure disposed on an outward-facing surface of at least one of the first and second planar peripheral wall portions, wherein said box-like enclosure is fixedly disposed relative to said sunlight concentrating means such that the concentrated sunlight is directed through the inlet opening into the interior cavity, wherein said box-like enclosure is operably shaped such that said concentrated sunlight directed into said interior cavity through said inlet opening is reflected between inward-facing surfaces of said first and second planar peripheral wall portions at a rate that optimizes heat transfer to said first and second planar peripheral wall portions before exiting said interior cavity through said outlet opening, and wherein said at least one bull's eye structure includes a plurality of first concentric circular ridge structures disposed in an associated fixed grating period such that a radiant energy beam is emitted from said at least one bull's eye structure having a peak emission wavelength that is roughly equal to said fixed grating period, and at least one photovoltaic (PV) cell is fixedly disposed adjacent to the metamaterial emitter and outside of said interior cavity such that said at least one PV cell is positioned to receive said radiant energy beam emitted from said at least one bull's eye structure, wherein said at least one PV cell includes means for converting said radiant energy beam into primary electrical energy; and a thermal power system including means for receiving unconverted thermal energy passed from the interior cavity of the box-like enclosure, and for converting said unconverted thermal energy into secondary electric power.

2. The solar power system of claim 1, wherein the sunlight concentrating system comprises a heliostat including a plurality of mirrors operably disposed to generate said concentrated sunlight with an intensity greater than one-hundred suns at the inlet opening of the box-like enclosure.

3. The solar power system of claim 2, wherein said box-like enclosure comprises an all-metal structure, and wherein an entirety of the box-like enclosure comprises a single refractory metal.

4. The solar power system of claim 3,
wherein the optimal wavelength range of said at least one PV cell is 0.5 microns to 3 microns, and
wherein said at least one bull's eye structure is configured such that the fixed grating period separating the concentric circular ridge structures of each of said at least one bull's eye structure is in the range of 10 nanometers and 5 microns.

5. The solar power system of claim 3,
wherein the PV cell comprises a low-bandgap PV cell and the optimal wavelength range of said PV cell is 1.0 microns to 2.0 microns, and
wherein said at least one bull's eye structure is configured such that the fixed grating period is in the range of 0.5 microns and 3 microns.

6. The solar power system of claim 1,
wherein said metamaterial emitter comprises a plurality of bull's eye structures disposed in sets on said peripheral wall, each said set comprising a first bull's eye structure including a first group of concentric circular ridge structures having a first fixed grating period, and a second bull's eye structure including a second group of concentric circular ridge structures having a second fixed grating period, and
wherein the second fixed grating period is larger than the first fixed grating period.

7. The solar power system of claim 1,
wherein said one or more bull's eye structure comprises a first bull's eye structure and a second bull's eye structure disposed on said peripheral wall, said first bull's eye structure including a first group of concentric circular ridge structures, and said second bull's eye structure including a second group of concentric circular ridge structures, and
wherein the first and second bull's eye structures are multiplexed such that at least some of the circular ridge structures of the first group intersect at least some of the circular ridge structures of said second group.

8. The solar power system of claim 7,
wherein said first group of concentric circular ridge structures of said first bull's eye structure have a first fixed grating period, and said second group of concentric circular ridge structures of said second bull's eye structure have a second fixed grating period, and
wherein the second fixed grating period is larger than the first fixed grating period.

9. The solar power system of claim 2,
wherein spaced-apart first and second planar peripheral wall portions respectively include first and second inward-facing surfaces that face the interior cavity, and respectively include first and second outward-facing surfaces that face away from the interior cavity,
wherein the at least one bull's eye structure includes at least one first bull's eye structure and at least one second bull's eye structure, the at least one first bull's eye structure being disposed on the first outward-facing surface of the first planar peripheral wall portion and including a plurality of first concentric circular ridge structures disposed in an associated first fixed grating period such that, when the metamaterial emitter is heated to a temperature above 1000° K, a first radiant energy beam is emitted from said at least one first bull's eye structures having a peak emission wavelength that is roughly equal to said first fixed grating period, and said at least one second bull's eye structure being disposed on the second outward-facing surface of the second planar peripheral wall portion and including a plurality of second concentric circular ridge structures disposed in an associated second fixed grating period such that, when the metamaterial emitter is heated to a temperature above 1000° K, a second radiant energy beam is emitted from said at least one second bull's eye structures having a peak emission wavelength that is roughly equal to said second fixed grating period, and
wherein said at least one PV cell includes first and second PV cells fixedly disposed adjacent to the metamaterial emitter such that said first PV cell is positioned to receive said first radiant energy beam emitted from said at least one first bull's eye structure, and such that said second PV cell is positioned to receive said second radiant energy beam emitted from said at least one second bull's eye structure.

10. The solar power system of claim 9,
wherein the solar TPV converter is disposed on a tower, and
wherein the heliostat includes said array of mirrors disposed at ground level and controlled to reflect sunlight through the inlet opening of the box-like enclosure during daylight hours.

11. The solar power system of claim 10, wherein said box-like enclosure further comprises:
a first compound parabolic trough structure and a second compound parabolic trough structure respectively integrally connected to first end portions of said first and second planar peripheral wall portions; and
a first funnel-shaped outlet structure and a second funnel-shaped outlet structure respectively integrally connected to the second end portions of said first and second planar peripheral wall portions,
wherein the first and second planar peripheral wall portions, the first and second compound parabolic trough structures and the first and second funnel-shaped outlet structures comprise said single refractory metal.

12. The solar power system of claim 11, wherein said box-like enclosure is maintained at a tilted angle relative to ground level such that the first and second funnel-shaped outlet structures are maintained above the first and second compound parabolic trough structures, thereby causing a convective air current that moves the unconverted thermal energy from the interior cavity through the first and second funnel-shaped outlet structures.

13. The solar power system of claim 11, wherein said thermal power system comprises a molten salt loop receiver coupled to said outlet opening of the box-like enclosure, said molten salt loop receiver being configured to store said unconverted thermal energy passed from the interior cavity through said outlet opening, and means for converting the stored thermal energy into said secondary electric power.

14. The solar power system of claim 13,
wherein said at least one first bull's eye structure comprises a first array of multiplexed bull's eye structures disposed on the first outward-facing surface of said first peripheral wall portion, and
wherein said at least one second bull's eye structure comprises a second array of multiplexed bull's eye structures disposed on the second outward-facing surface of said second peripheral wall portion.

15. A solar power harvesting system comprising:
a sunlight concentrating system for generating concentrated sunlight;
a solar thermophotovoltaic (TPV) converter including:
a metamaterial emitter including a box-like enclosure at least partially formed by a peripheral wall defining an interior cavity having an inlet opening, and at least one first bull's eye structure disposed on an outward-facing surface of the peripheral wall, wherein said box-like enclosure is fixedly disposed relative to said sunlight concentrating means such that the concentrated sunlight is directed through the inlet opening into the interior cavity, and wherein said at least one bull's eye structure includes a plurality of first concentric circular ridge structures disposed in an associated fixed grating period such that a radiant energy beam is emitted from said at least one bull's eye structure having a peak emission wavelength that is roughly equal to said fixed grating period, and
at least one photovoltaic (PV) cell fixedly disposed adjacent to the metamaterial emitter such that said at least one PV cell is positioned to receive said radiant energy beam emitted from said at least one bull's eye structure, wherein said at least one PV cell includes means for converting said radiant energy beam into primary electrical energy; and
a thermal power system including means for receiving unconverted thermal energy passed from the interior cavity of the box-like enclosure, and for converting said unconverted thermal energy into secondary electric power,
wherein the peripheral wall of the box-like enclosure includes a first peripheral wall portion and a second peripheral wall portion spaced from the first peripheral wall portion, said first and second peripheral wall portions respectively having first and second inward-facing surfaces that faces the interior cavity, and respectively having first and second outward-facing surfaces that face away from the interior cavity,
wherein said box-like enclosure further comprises:
a first compound parabolic trough structure and a second compound parabolic trough structure respectively integrally connected to first end portions of said first and second peripheral wall portions; and
a first funnel-shaped outlet structure and a second funnel-shaped outlet structure respectively integrally connected to the second end portions of said first and second peripheral wall portions, and
wherein the first and second peripheral wall portions, the first and second compound parabolic trough structures and the first and second funnel-shaped outlet structures comprise a single refractory metal.

16. The solar power system of claim 15,
wherein said at least one PV cell includes first and second PV cells fixedly disposed adjacent to the metamaterial emitter such that said first PV cell is positioned to receive said first radiant energy beam emitted from said at least one first bull's eye structure, and such that said second PV cell is positioned to receive said second radiant energy beam emitted from said at least one second bull's eye structure, and wherein the optimal wavelength range of said first and second PV cells is 0.5 microns to 3 microns, and
wherein said at least one first bull's eye structure comprises: a first array of multiplexed bull's eye structures disposed on the first outward-facing surface of said first peripheral wall portion; and a second array of multiplexed bull's eye structures disposed on the second outward-facing surface of said second peripheral wall portion, and wherein each of said first array of multiplexed bull's eye structures and said second array of multiplexed bull's eye structures is configured such that the fixed grating period separating the concentric circular ridge structures of each of said bull's eye structure is in the range of 10 nanometers and 5 microns.

17. The solar power system of claim 15,
wherein said at least one PV cell includes first and second PV cells fixedly disposed adjacent to the metamaterial emitter such that said first PV cell is positioned to receive said first radiant energy beam emitted from said at least one first bull's eye structure, and such that said second PV cell is positioned to receive said second radiant energy beam emitted from said at least one second bull's eye structure, and wherein said first and second PV cells comprise low-bandgap PV cells, and the optimal wavelength range of said first and second PV cells is 1.0 microns to 2.0 microns, and wherein said at least one first bull's eye structure comprises: a first array of multiplexed bull's eye structures disposed on the first outward-facing surface of said first peripheral wall portion; and a second array of multiplexed bull's eye structures disposed on the second outward-facing surface of said second peripheral wall portion, and wherein each of said first array of multiplexed bull's eye structures and said second array of multiplexed bull's eye structures is configured such that the fixed grating period separating the concentric circular ridge structures of each of said bull's eye structure is in the range of 1.0 microns and 2.0 microns.

* * * * *